US009258738B2

(12) United States Patent
Haberland

(10) Patent No.: US 9,258,738 B2
(45) Date of Patent: Feb. 9, 2016

(54) DISTRIBUTED LOAD BALANCING IN A RADIO ACCESS NETWORK

(71) Applicant: Alcatel Lucent, Paris (FR)

(72) Inventor: Bernd Haberland, Fellbach (DE)

(73) Assignee: Alcatel Lucent, Boulogne-Billancourt (FR)

( * ) Notice: Subject to any disclaimer, the term of this patent is extended or adjusted under 35 U.S.C. 154(b) by 86 days.

(21) Appl. No.: 13/261,896

(22) PCT Filed: Oct. 9, 2012

(86) PCT No.: PCT/EP2012/069909
§ 371 (c)(1),
(2) Date: May 14, 2014

(87) PCT Pub. No.: WO2013/072138
PCT Pub. Date: May 23, 2013

(65) Prior Publication Data
US 2014/0293784 A1    Oct. 2, 2014

(30) Foreign Application Priority Data
Nov. 14, 2011  (EP) ..................................... 11306485

(51) Int. Cl.
*H04W 28/08*  (2009.01)
*H04W 88/04*  (2009.01)
(Continued)

(52) U.S. Cl.
CPC .............. *H04W 28/08* (2013.01); *G06F 9/505* (2013.01); *H04L 67/1002* (2013.01); *H04L 67/1004* (2013.01); *H04W 88/04* (2013.01); *H04W 88/085* (2013.01)

(58) Field of Classification Search
None
See application file for complete search history.

(56) References Cited

U.S. PATENT DOCUMENTS

2008/0045226 A1    2/2008  Liu
2008/0318589 A1   12/2008  Liu et al.

FOREIGN PATENT DOCUMENTS

| EP | 1 713 290 A1 | 10/2006 |
| EP | 1 954 075 A1 |  8/2008 |

(Continued)

OTHER PUBLICATIONS

Chttl et al., "Views on heterogeneous deployment scenarios with distributed RRHs," 3$^{rd}$ Generation Partnership Project (3GPP), 3GPP TSG RAN WG1 Meeting #64, R1-111006, pp. 1-3, XP050490799, Taipei, Taiwan, Feb. 21-25, 2011.

(Continued)

*Primary Examiner* — Christopher Crutchfield
(74) *Attorney, Agent, or Firm* — Fay Sharpe LLP

(57) ABSTRACT

Embodiments relate to a baseband processing apparatus (200) for processing baseband signals to or from at least one remote radio head (204), the at least one remote radio head (204) serving a radio cell of a cellular communication system, the baseband processing apparatus (200) comprising: an interface (208) to connect the baseband processing apparatus (200), as a first node (200-1) of a network (300), to a further baseband processing apparatus as a second node (200-2) of the network (300); a plurality of dedicated user data processors (210; 410; 420), wherein each is operable to process user specific data of first users being associated to the radio cell, the processing of the user specific data of the first users leading to a processing load of the first node (200-1); and a load balancer (212) operable to exchange load information with a load balancer of the second node (200-2) via the interface (208) and to distribute processing tasks between the plurality of dedicated user data processors (210; 410; 420) of the first node (200-1) and/or to distribute processing tasks between plurality of dedicated user data processors (210; 410; 420) of the first node (200-1) and the second node (200-2) in response to the exchanged load information in order to distribute processing load among different nodes of the network (300).

16 Claims, 7 Drawing Sheets

(51) Int. Cl.
*H04L 29/08* (2006.01)
*G06F 9/50* (2006.01)
*H04W 88/08* (2009.01)

(56) References Cited

FOREIGN PATENT DOCUMENTS

| EP | 2 265 054 A1 | 12/2010 |
| EP | 2 512 202 A1 | 10/2012 |
| JP | 2007-529926 A | 10/2007 |
| WO | WO 00/28754 A1 | 5/2000 |

OTHER PUBLICATIONS

Cmcc et al., "Application of BBU+RRU based CoMP system to LTE-Advanced," 3$^{rd}$ Generation Partnership Project (3GPP), 3GPP TSG-RAN #55, R1-084612, pp. 1-2, XP050317843, Prague, Czech Republic, Nov. 10-14, 2008.
International Search Report for PCT/EP2012/069909 dated Dec. 10, 2012.

DISTRIBUTED LOAD BALANCING IN A RADIO ACCESS NETWORK

Embodiments of the present invention generally relate to wireless communications and, more specifically, to distributed load balancing of baseband resources in a radio access network.

BACKGROUND

Demands for higher data rates for mobile services are steadily increasing. At the same time modern mobile communication systems, such as $3^{rd}$ Generation (3G) systems and $4^{th}$ Generation (4G) systems, provide enhanced technologies which enable higher spectral efficiencies and allow for higher data rates and cell capacities. As the demand for high-rate services with increasing variance grows faster than the cell capacities, operators are urged to increase the number of cells in their networks, i.e. the density of base stations increases. Base station transceivers are major contributors to the overall power consumption of a mobile communication system or network and therewith also major contributors to the OPerational EXpenditures (OPEX) operators are facing. One power saving strategy is to move processing capacity away from the base station transceivers and towards centralized processing units providing processing capabilities for several base station transceivers. The processing equipment of a base station transceiver consumes a significant part of a base station transceiver's total power, although the processing capabilities of a base station transceiver are only fully exploited in high load conditions, which do not occur permanently, but rather during peak hours only. Different cells in radio access systems are very heterogeneous to each other in regard to their traffic load over time. This means in a cluster of cells, the different cells do not have their peak busy hour at the same time. This behavior is qualitatively shown in FIGS. 1a and 1b, wherein FIG. 1a illustrates an exemplary traffic load-over-time graph 100 for a radio cell A, while FIG. 1b illustrates an exemplary traffic load-over-time graph 110 for a radio cell B. While, for example, cell A experiences its highest load around 11 a.m., cell B experiences its highest load around 11 p.m.

Currently, the Radio Access of mobile Networks (RAN) uses base stations or base station transceivers, as e.g. eNodeBs for the most recent technology LTE (Long Term Evolution); handling all radio, baseband and control functions. These base stations, in case of macro base stations, consist of voluminous antennas at elevated positions with electronic systems requiring considerable spatial installation volume. In addition, supplementary systems for power supply, air conditioning, etc. are to be installed in close proximity. In densely populated areas such installations are to be repeated over a grid of ~1 km or less mesh width.

Much of the entire RAN's CApital EXpenditure (CAPEX) and OPEX is therefore attributed to each site's individual processing units, as for example site rent, infrastructure, processing hardware, maintenance, etc. Several approaches to cut at least a big share of these cost elements have been subject to recent research activities. Some solutions reduce emitted power and processing complexity and therewith reduce required volume, however, these solutions are at the expense of increasing the number of required sites.

SUMMARY

It is one finding of the present invention that the cost efficiency of a radio access network can be improved by moving processing capabilities away from the radio front ends and by using cloud computing or load balanced processing units as processing capability. Such processing capability can be shared by a number of radio front-ends, whereby the overall processing capability can be utilized more efficiently. Embodiments may therefore provide a concept with a reduced overall processing capacity therewith reducing the overall power consumption, the OPEX and CAPEX of a mobile communication system.

Cloud computing may lower operating cost by a shared use of large installed resources as pools. In addition, installation costs may reduce by scaling effects of hardware and lower requirements (per user) for costly peripheral equipment and hardware. With a sophisticated load sharing of installed processing resources taking into account different load profiles over time for indoor (either enterprise or residential) or outdoor applications, a significant reduction of sites and required hardware can be achieved. This leads to OPEX and CAPEX reductions for the operators. In addition to the load balancing of processing resources, embodiments of the present invention may also enable allocating processing resources from low traffic areas to high traffic areas in a general context of load management.

It is a further finding that a multi-standard configuration can be modified in a semi-static way by software (SW) replacement, even if individual processing elements are only capable of operating one radio standard or Radio Access Technology (RAT) at a given time. This provides the operator more flexibility of evolving a multi-standard system without the need to change any hardware (HW).

Hence, embodiments of the present invention aim at renewing current RAN architectures for next generation mobile Radio Access Networks (RANs) by providing a decentralized load balancing approach that integrates cloud computing elements. Decentralized load balancing may thereby be regarded as an important alternative to centralized load balancing architectures, i.e. to architectures where load balancing is performed by a central network entity.

In embodiments, the RAN architecture may be composed of a Remote Radio Head (RRH), which may be regarded as a radio front-end, i.e., which receives and transmits the actual radio signals and establishes at least one radio cell. In the following, two directions of transmission will be considered. The first one is referred to as downlink or forward link. It refers to a transmission from the RAN, i.e. the RRH, to a mobile terminal or User Equipment (UE) in the coverage area. The second one is referred to as uplink or reverse link. It refers to a transmission from a mobile terminal to the RAN, i.e. the RRH. In the uplink a RRH may convert received radio signals from a transmission-band to baseband receive signals and provide the baseband receive signals to a distributed load balancing architecture of a cloud computing network. In the downlink the RRH may convert a baseband transmit signal, which has been processed in the cloud network, to the transmission-band and transmit the signal using one or multiple antennas.

In the following, it will be referred to the transmission-band as a system frequency band with a system bandwidth and a carrier frequency. The transmission-band may comprise a sub-band for downlink transmission and a sub-band for uplink reception of radio signals, as e.g. in a Frequency Division Duplex (FDD) system. In some embodiments the same transmission-band may be used for downlink and uplink, as in a Time Division Duplex (TDD) system.

In conventional solutions, there is a 1:1 relationship between a baseband processing unit and a RRH, where the baseband processing capacity is dimensioned according to peak traffic. In some embodiments the RRHs may provide transmission (Tx), reception (Rx) and antenna functions. A RRH may be spatially separated from an associated baseband processing unit or Base-Band Unit (BBU) as a pool of conventional baseband processing elements so that the latter can be combined within an inter-BBU cloud computing cluster of several BBUs. This opens the path to apply technologies of cloud computing (intra-BBU and inter-BBU), establish distributed or decentralized load balancing and directly reduce the number of required processing sites and in parallel the associated installation cost, but also maintenance and power consumption.

In other words, embodiments may provide RAN architecture with RRHs and baseband processing units forming nodes of a cloud computing architecture. Thereby each individual network node, i.e. BBU, is equipped with a load balancing entity, such that the individual interconnected load balancing entities of the network nodes together form a distributed or decentralized load balancer, which will also be referred to as Decentralized Cloud Controller (DCC) in the following. Thereby, a DCC may, in cooperation with other DCCs of the cloud computing network, distribute or route the load received by its associated BBU from the RRHs to other nodes or BBUs of the network. This increases the flexibility of the traffic distribution for an operator.

According to a first aspect of the present invention it is provided a Base-Band Unit (BBU), i.e., a baseband processing apparatus. The baseband processing apparatus serves for processing baseband signals of one or more users. Thereby, the baseband signals may either be directed to or stem from at least one Remote Radio Head (RRH) coupled to the baseband processing apparatus, wherein the at least one RRH establishes or serves a cell of a cellular communication system or network.

According to various embodiments the cellular communication system may, for example, correspond to one of the mobile communication systems standardized by the $3^{rd}$ Generation Partnership Project (3GPP), as Universal Terrestrial Radio Access Network (UTRAN) or Evolved UTRAN (E-UTRAN), e.g. Universal Mobile Telecommunication System (UMTS), a Global System for Mobile Communication (GSM) or Enhanced Data Rates for GSM Evolution (EDGE) network, a GSM/EDGE Radio Access Network (GERAN), Long-term Evolution (LTE) or LTE-Advanced (LTE-A). Generally, any system based on Code Division Multiple Access (CDMA), Orthogonal Frequency Division Multiple Access (OFDMA), Frequency Division Multiple Access (FDMA), Time Division Multiple Access (TDMA), etc. In the following the terms mobile communication system and cellular communication system/network are used interchangeably.

Accordingly, the at least one Remote Radio Head (RRH) may, for example, comprise a radio transceiver for a GSM, an EDGE, a UMTS, an LTE, or an LTE-A cellular communication system. The at least one RRH may be coupled to the baseband processing apparatus for exchanging complex valued digital baseband data between the baseband processing apparatus and the at least one RRH. For that purpose an interface known as Common Public Radio Interface (CPRI) may be used, for example.

The baseband processing apparatus may serve as a first processing node of a network, which may, for example, be a cloud computing network. According to embodiments, the baseband processing apparatus comprises an interface to connect the baseband processing apparatus to a further baseband processing apparatus serving as a second processing node of the network. Said interface can be adapted for exchanging complex valued digital baseband data between the baseband processing apparatuses (BBUs). The interface may further serve for exchanging control information between the interconnected BBUs, such as an extended X2-interface as part of the $3^{rd}$ Generation Partnership Project (3GPP) specifications for LTE.

Cloud computing or a cloud computing network may be understood a technology that may provide computation, software, data access, and storage services that do not require end-user knowledge of a physical location and configuration of the system or network that delivers the services. Hence, cloud computing describes a supplement, consumption, and delivery model for IT services e.g. based on Internet Protocols (IP), and typically involves provisioning of dynamically scalable and often virtualized resources. Hence, in a BBU cloud computing network there is a pool of BBU hardware or baseband processing resources. Each BBU may be regarded as a network node of the cloud computing network, wherein each node accommodates one or more of such computing or processing resources. According to embodiments, a baseband processing task is not necessarily tied to a particular network node but may dynamically be allocated to an arbitrary other network node, using the distributed load management and distribution approach of embodiments of the present invention. Hence, an efficient use of the available distributed hardware resources may be achieved.

Further, the baseband processing apparatus comprises a plurality of dedicated user data processors, wherein each of the dedicated user data processors is operable to process user specific data of one of a plurality of first users being associated to the radio cell served by the at least one RRH.

According to some embodiments the user specific data may be understood as bearer specific data, i.e., data related to a bearer comprising data of one or more of the group of user specific Radio Access Bearer (RAB), Radio Bearer (RB), and/or Signaling Radio Bearer (SRB). That is to say, the process user specific data or data streams can refer to different radio bearers, a radio bearer being a protocol context for a data service of a user. In other words, a user may utilize multiple services, which are provided using different radio bearers. A radio bearer can be established utilizing protocols of multiple layers. A prominent example is the Signaling Radio Bearer (SRB) for exchanging signaling or control information of Layer 3 (L3), Radio Resource Control (RRC) as an example in UMTS or LTE. Such an SRB involves a protocol context, i.e. it uses the service provided by Layer 2 (L2) to exchange L3 control information or signaling. The service provided by L2 is referred to as the radio bearer. The Control-plane (C-plane) radio bearers, which are provided by Radio Link Control (RLC) to RRC, are denoted as signaling radio bearers, cf. e.g. 3GPP Specification, Radio Interface Protocol Architecture 3GPP TS 25.301 V10.0.0.

In UMTS or LTE the Physical Layer (Layer 1 or PHY), the Medium Access Control-Layer (Layer 2 or MAC), RLC-layer and RRC can be involved. All of these protocols have been standardized by the 3GPP and their respective specifications are published and are considered as known in the following.

The processing of the user specific data (packets or streams) of the first users leads to a certain processing load of the baseband processing apparatus, i.e., the first processing node. The baseband processing apparatus also comprises a load balancer, also referred to as Decentralized Cloud Controller (DCC), which is operable to exchange load information with a load balancer or DCC of the second processing node via the inter-node interface and to distribute processing tasks between the plurality of dedicated user data processors of the first processing node and/or to distribute processing tasks between the plurality of dedicated user data processors of the first processing node and the second processing node in response to the exchanged load information. The distribution of the processing tasks among the available processing resources in the cloud computing network may be done according to a load balancing criterion.

Such a load balancing criterion may for example be an equally shared distribution of the load among the processing nodes. Another criterion may be to optimize the power consumption of the processing nodes. For example, some processing nodes or parts thereof may be switched off for as long as other active processing nodes can handle the load.

Hence, embodiments of the present invention may provide a baseband or bearer signal processing scheme in a distributed or cloud-like manner, since the baseband or bearer processing can be carried out by a plurality of different interconnected baseband processing apparatuses (BBUs) as processing nodes, which can be spatially separated. This may provide the advantage that more processing power can be made available through utilization of a distributed network of processing nodes, when there is a traffic hot-zone at a certain RRH cluster.

Moreover, embodiments may provide the advantage that scalable processing power can be made available per radio cell, since the services of a radio cell can be de-multiplexed into service or user specific data packets, which can then in turn be routed to different processing nodes. In other words, the processing of user specific (bearer) data may be distributed among the various network nodes according to a given load balancing criterion. That means that there is no fixed association between a given RRH and a BBU to which the RRH is physically connected, since user specific baseband or bearer signals processed by the RRH are not necessarily pre- or postprocessed by the physically connected BBU. Due to the distributed load balancing architecture, the BBU cloud network decides on which node to perform the baseband or bearer processing of a given user based on the load balancing criterion.

Hence, the load balancer of the first processing node is operable, possibly together with the load balancer of the second processing node, to initiate an exchange of second user specific data with the second node via the inter-BBU interface in response to the previously exchanged load information. Thereby the exchanged second user specific (bearer) data is associated or dedicated to a second user, which is associated to the same radio cell or RRH as the first users. However, the second user is different from the first users. In other words, he does not belong to the first users which are processed at the first node. That is to say, in certain load situations the cloud computing network or a plurality of DCCs may decide to shift the baseband or bearer processing of the second user specific data from the first processing node to another, e.g. the second, processing node of the network in order to improve the load situation. Hence, a dedicated user data processor of the second node may process user specific data of the second user who is actually associated to another radio cell (e.g. the cell associated with the first processing node). In addition, there is a load balancing within a BBU node controlled by the DCC comprised of the BBU node. For providing user specific baseband or bearer data to a RRH or, vice versa, for obtaining the user specific baseband or bearer data from a RRH, the baseband processing apparatus may further comprise a cell specific entity, which will be referred to as "cell physical layer processor" in the sequel. Thereby, the cell physical layer processor serves for processing a baseband radio frame structure of a radio frame for or from a radio transceiver of the at least one RRH serving both the first users and the second user, the radio frame comprising the user specific data of the first users and the user specific data of the second user. In other words, the cell physical layer processor serves an interface between the plurality of dedicated user data processors and at least one RRH connected to the baseband processing apparatus or BBU. Since, the cell physical layer processor may process data packets of both the first users and the second user, whose user specific data has been or will be processed by another processing node, the cell physical layer processor's input or output is arbitrarily configurable. That means, due to the decentralized load balancing or cloud controlling the cell physical layer processor of the first processing node may additionally be coupled to dedicated user data processors of other processing nodes of the cloud. The cell physical layer processor may be understood as a means for transforming the user specific (bearer) data of the first users and the second user into a common baseband signal radio frame structure, and vice versa, i.e., for transforming the common baseband radio frame structure into the user specific (bearer) data of the first users and the second user. The direction of the trans-formation depends on whether the user specific (bearer) data is to be sent (downlink) or to be received (uplink).

For the downlink direction the cell physical layer processor may receive, from the plurality of dedicated user data processors of the first node, downlink (bearer) data packets dedicated to first users associated to the cell served by the at least one RRH coupled to the first node. In addition, the cell physical layer processor may receive, from one or more dedicated user data processors of a second node, downlink data packets of second users associated to the same cell as the first users. The latter downlink data packets may have been processed at the second node for load balancing reasons. The cell physical layer processor of the first node, however, is operable to multiplex the received downlink data packets of both the first and the second users into a common downlink radio frame structure according a downlink multiple access technology. Multiple access technologies may, for example, be one or a combination of Code Division Multiple Access (CDMA), Orthogonal Frequency Division Multiple Access (OFDMA), Frequency Division Multiple Access (FDMA), Time Division Multiple Access (TDMA), etc.

Instead, for the uplink direction the cell physical layer processor of a first node may receive, from at least one RRH connected to the first node, uplink data packets dedicated to first and second users associated to the cell served by the at least one RRH. In this case, the cell physical layer processor is operable to decompose or de-multiplex the received user specific uplink data from a multiplexed uplink radio frame structure (according an uplink multiple access technology). One or more decentralized load balancers may then, in response to previously exchanged load information, initiate a further processing of the de-multiplexed second user specific uplink data at the second node, for example, since no processing capabilities for second user data are left at first node. The dedicated user data processor(s) of the first node may only process the de-multiplexed first user specific uplink data.

For example, in a CDMA system, the different services or signals can be distinguished by orthogonal channelization codes. Each channelization code carries data of a certain service. The radio signal and also the baseband signal correspond to a superposition of the signals for all services to be provided by a cell, i.e. all the channelization codes weighted with the services' data. The superposition can for example be an addition of all signals. Consequently, such superposition has to be composed before transmission and decomposed after reception. This process is also referred to as multiplexing and de-multiplexing. Hence, the cell physical layer processor can be adapted to compose a transmit baseband signal by multiplexing various user specific downlink data packets, wherein different user specific downlink data packets are associated to different users or services provided by the cellular communication system or network in a coverage area of the at least one RRH. On the other hand, the cell physical layer processor can be adapted to decompose a transmit baseband signal by de-multiplexing various user specific downlink data packets from the transmit baseband signal.

According to some embodiments, the plurality of dedicated user data processors of a processing node, i.e. a BBU, may comprise a first group of dedicated user data processing entities which is operable to process user specific data according to a first RAT, e.g. CDMA for UMTS. Further, the plurality of dedicated user data processors of the BBU may also comprise a second group of dedicated user data processing entities which is operable to process user specific data according to a second RAT, e.g. OFDMA for LTE. The different groups of dedicated user data processing entities may be implemented on one or different Printed Circuit Boards (PCBs), which will also be referred to as Channel Element Modules (CEM), possibly together with respective cell physical layer processors supporting the same RAT. That is to say, a first cell physical layer processor (supporting the first RAT) and the first group of dedicated user data processing entities may be integrated onto a first common CEM and a second cell physical layer processor (supporting the second RAT) and the second group of dedicated user data processing entities may be integrated onto a second common CEM or onto further CEMs of the same BBU.

According to some embodiments, a ratio between dedicated user data processing entities comprised by the first group and dedicated user data processing entities comprised by the second group may be configurable via software replacement. In other words, the RAT supported by a CEM board may, be changed by adequate software replacement. For example, if a processing node (baseband processing apparatus) comprises I CEM boards currently supporting UMTS and K CEM boards currently supporting LTE, the ratio I/K may be adapted to current needs simply by replacing the software of the CEM boards. For example, if more UMTS hardware resources are required, some of the LTE related CEM boards may be reconfigured to support UMTS by loading the respective software to the CEM board's memory.

According to a further aspect of the present invention it is provided a cloud computing network comprising at least two baseband processing apparatuses according to embodiments as different network nodes of the cloud computing network. Therewith a decentralized load balancing becomes possible as the decentralized load balancers of the first and the second node are operable to exchange load information via the interface between the first and the second network node and to distribute processing tasks between plurality of dedicated user data processors of the first node and the second node in response to the exchanged load information in order to distribute load among different nodes of the cloud computing network.

According to yet a further aspect of the present invention it is provided method of a baseband processing apparatus according to an embodiment. The method comprises a step of coupling the baseband processing apparatus as a first node of a cloud computing network to a further baseband processing apparatus as a second node of the cloud computing network via an interface. In a second step user specific (bearer) data of first users being associated to the at least one remote radio head is processed using a plurality of dedicated user data processors. The processing of the user specific data of the first users leads to a processing load at the first node. In a further step processing load information is exchanged between the first and the second node via the interface. And, in response to the exchanged processing load information, processing tasks are distributed between the plurality of dedicated user data processors of the first node and/or processing tasks are distributed between plurality of dedicated user data processors of the first node and the second node in order to distribute load among different nodes of the cloud computing network.

Some embodiments comprise a digital control circuit installed within the apparatus for performing the method. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor.

One benefit of embodiments is that a number of base station sites and/or base station processing capacity may be reduced due to the distributed load balancing, which in turn may lead to OPEX/CAPEX reduction. Furthermore, a semistatic multi-RAT radio access network may be provided by CEM software replacement. This allows following the evolution of radio standards without cumbersome HW modifications

BRIEF DESCRIPTION OF THE FIGURES

Some embodiments of apparatuses and/or methods will be described in the following by way of example only, and with reference to the accompanying figures, in which FIG. 1a, b show two traffic load profiles over time for a cell A and a cell B, respectively.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 2:
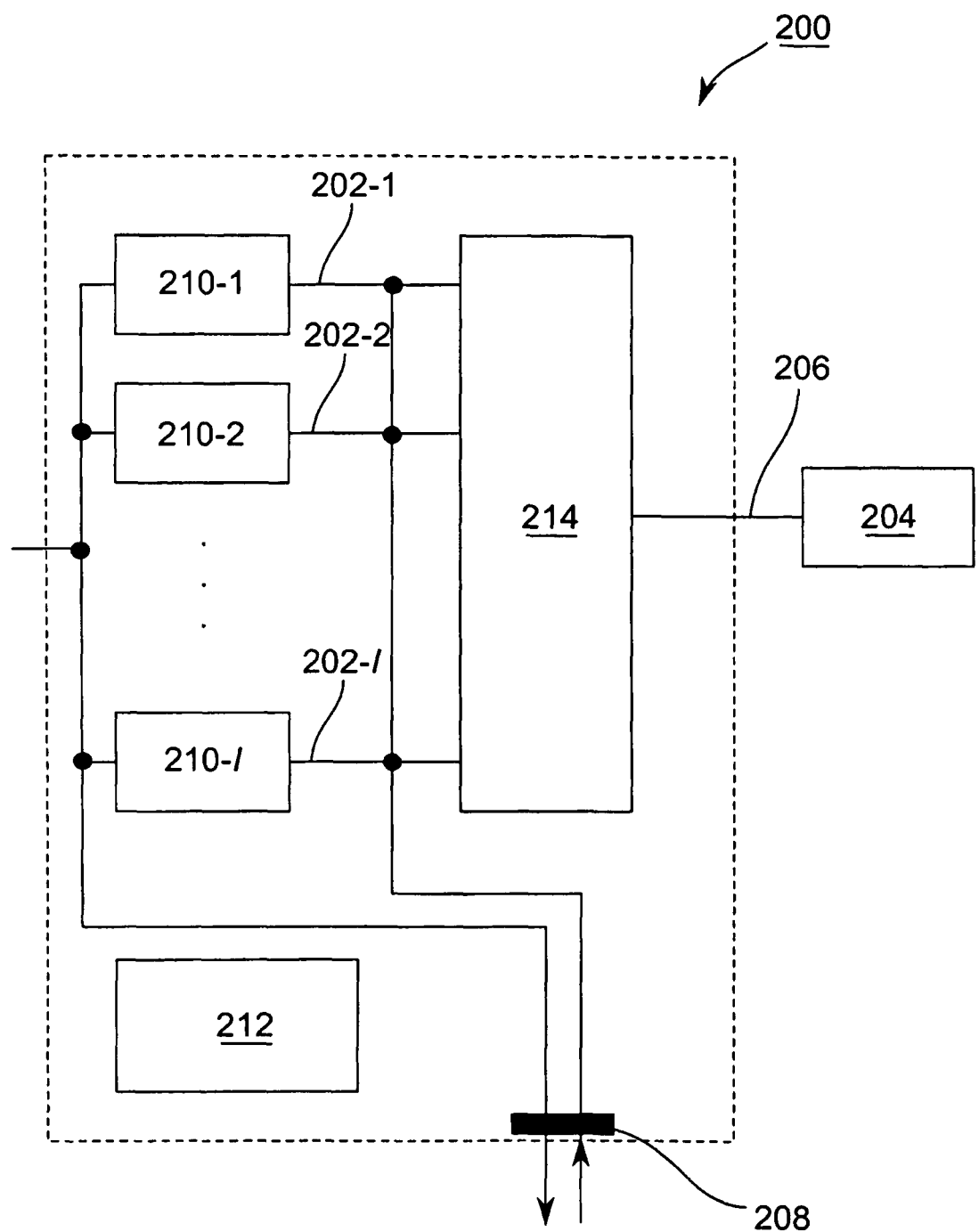
FIG. 2 schematically shows a block diagram of a baseband processing apparatus according to an embodiment of the present invention.

FIG. 2 schematically shows a functional block diagram of a baseband processing apparatus 200 according to an embodiment of the present invention.

The baseband processing apparatus 200 serves for processing baseband or bearer signals 202-1 to 202-I which are dedicated to a plurality of users. The baseband or bearer signals 202-1 to 202-I are to be forwarded to or are obtained from at least one remote radio head (RRH) 204, which is coupled to the baseband processing apparatus 200, for example, via an optical fiber link 206. The at least one RRH 204 serves a radio cell of a cellular communication system, such as an UMTS or LTE network or a combination thereof.

The baseband processing apparatus 200 further comprises an interface 208 for connecting the baseband processing apparatus 200, which may serve as the first node of a cloud computing network, to a further baseband processing apparatus (not shown), which may serve as a second node of the cloud computing network. The interface 208 may, for example, be an inter-base station interface, such as an extended X2 interface to be defined by 3GPP.

The baseband processing apparatus or base band unit (BBU) 200 also comprises a plurality of dedicated user data processors 210-1 to 210-I, wherein each of the dedicated user data processors is operable to process user specific baseband or bearer data of the plurality of users being associated to the radio cell or the at least one RRH 204. The processing of the user specific data of the plurality of users results in a certain load at the baseband processing apparatus 200, i.e., the first node of the cloud computing network. In order to distribute said load among different nodes of the cloud computing network the baseband processing apparatus 200 further comprises a load balancer 212, which is operable to exchange load information with a load balancer of the second network node via the interface 208 and to distribute processing tasks between the plurality of dedicated user data processors 210-1 to 210-I of the first network node 200 and/or to distribute processing tasks between the plurality of dedicated user data processor 210-1 to 210-I of the first node 200 and user data processors of the second node, in response to the exchanged information.

The load balancer 212 of the first node and the load balancer of the second node (not shown in FIG. 2) both may be regarded as decentralized cloud controllers (DCC), which may cooperate for load balancing and processing capacity distribution in the cloud computing network.

Each of the plurality of dedicated user data processors 210 may be regarded as an entity for performing user plane protocol stack processing and/or dedicated control plane protocol stack processing of the respective user specific bearer data. This protocol stack processing is to be separated from physical layer (PHY) radio frame processing, wherein user (or bearer) specific data is either adapted to a radio frame structure (downlink), or a radio frame structure is decomposed to the plurality of user (or bearer) specific data packets or streams (uplink).

As an interface between the aforementioned protocol stack processing and PHY radio frame processing embodiments of the baseband processing apparatus 200 may further comprise a cell physical layer processor 214 for processing a baseband radio frame structure of a radio frame to or from a radio transceiver of the at least one remote radio head 204 serving the radio cell. The cell physical layer processor 214 may be operable to perform one or more processing steps of the group of baseband-to-transmissionband conversion, transmissionband-to-baseband conversion, de-multiplexing, multiplexing, Fast Fourier Transform (FFT), Inverse Fast Fourier Transform (IFFT), Cyclic Prefix Insertion (CPI), Cyclic Prefix Removal (CPR), spreading, de-spreading, etc.

For the distribution of processing load the load balancer 212 may be operable to initiate an exchange of second user specific data with the second processing node via the interface 208 in response to previously exchanged load information. Thereby, the second user specific data is associated to a second user, who is associated to the same radio cell and/or the at least one RRH 204 as the first users. The physical layer processor 214 is operable to process baseband radio frame structure of a radio frame (either in the downlink or uplink direction) to or from the at least one RRH 204 serving the first uses as well as the second user, wherein the radio frame comprises user specific data of the first user and the second user.

Hence, for the downlink direction, the load balancer 212 may be operable, in response to be exchanged load information, to initiate the processing of second user specific downlink data for the second user (served by the at least one RRH 204 coupled to the first node 200) at the second node, and to receive the processed second user specific downlink data from the second node by the interface 208. The dedicated user data processors 210-1 to 210-I of the first node may be operable to process first user specific downlink data for first users served by the at least one RRH 204. In this case the cell physical layer processor 214 is operable to multiplex the first and the second user specific downlink data into a common downlink radio frame structure according to a downlink multiple access technology, since all downlink data is for the users and the second user both being served by the at least one RRH 204. That is to say, the cell physical layer processor 214 may multiplex first user specific data which has been processed by its own associated network node 200 and second user specific data which has been processed by another network node of the cloud computing network. This means that the inputs to the cell physical layer processor 214 are not fixed at all. Instead, they may be freely configured by the distributed or decentralized load balancing concept of the present invention.

For an uplink situation the cell physical layer processor 214 may be operable to de-multiplex received first and second user specific uplink data from an uplink radio frame structure according to an uplink multiple access technology, as, for example, OFDMA or CDMA. The received uplink radio frame structure comprises uplink data of first and second users both served by the at least one RRH 204 coupled to the first node 200. In this case, the load balancer 212 may be operable, in response to the exchanged load information, to initiate a further processing of the de-multiplexed uplink data of the second users at the second node for the case where no processing capabilities for the second users are left at the first network node 200. The dedicated user data processor 210-1 to 210-I may only process the de-multiplexed uplink data of the first users due to processing or computing capability restrictions.

In both described downlink/uplink scenarios the cloud computing network may, hence, decide to shift the processing of user specific data from the first network node or BBU 200 the second network node or BBU in case this leads to a better load distribution within the network.

As has been mentioned before, a plurality of BBUs 200 may be combined to a distributed cloud computing network. Such distributed cloud network architecture is shown in FIG. 3.

Figure 1A:
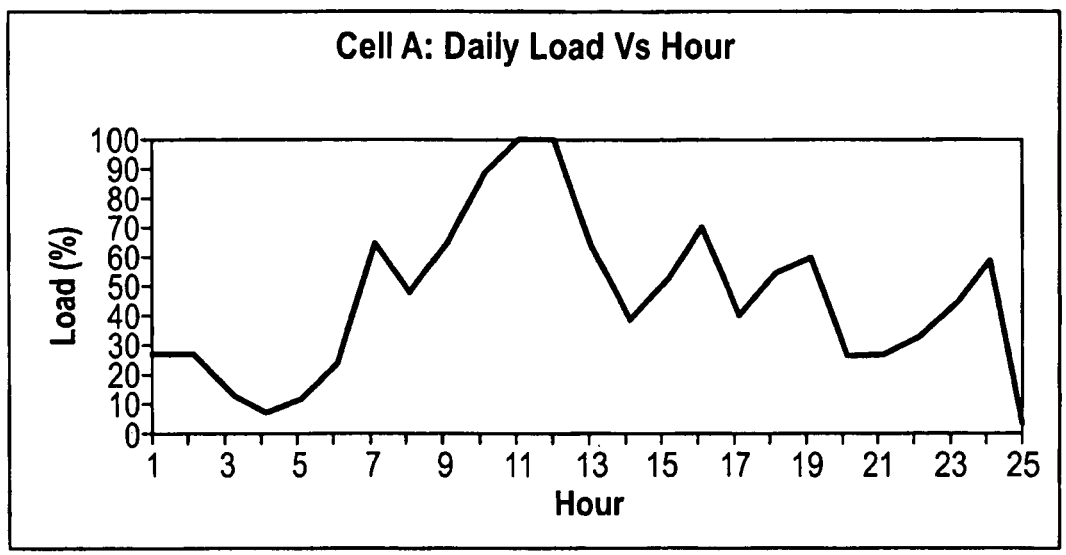
Figure 1B:
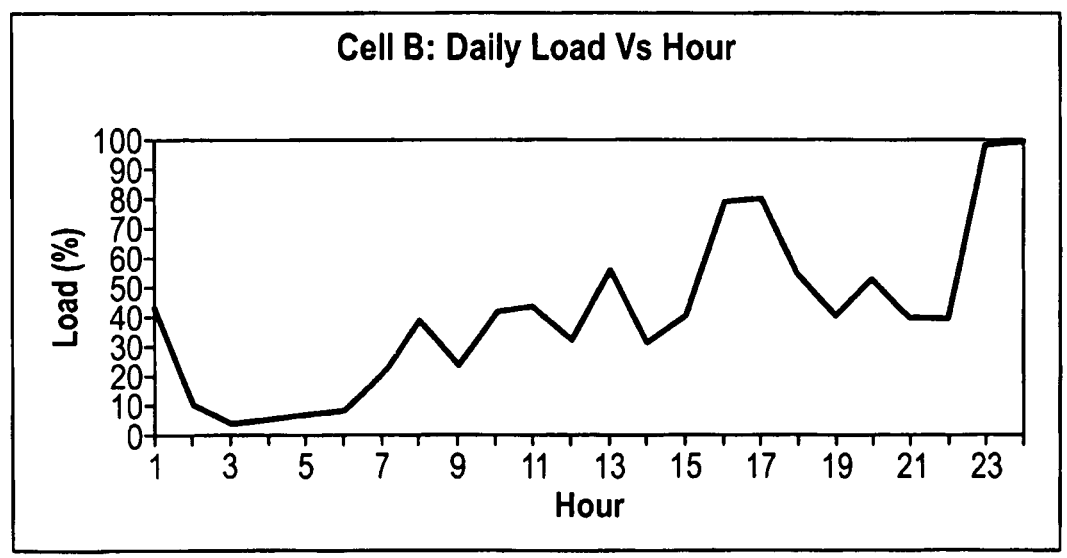
Figure 3:
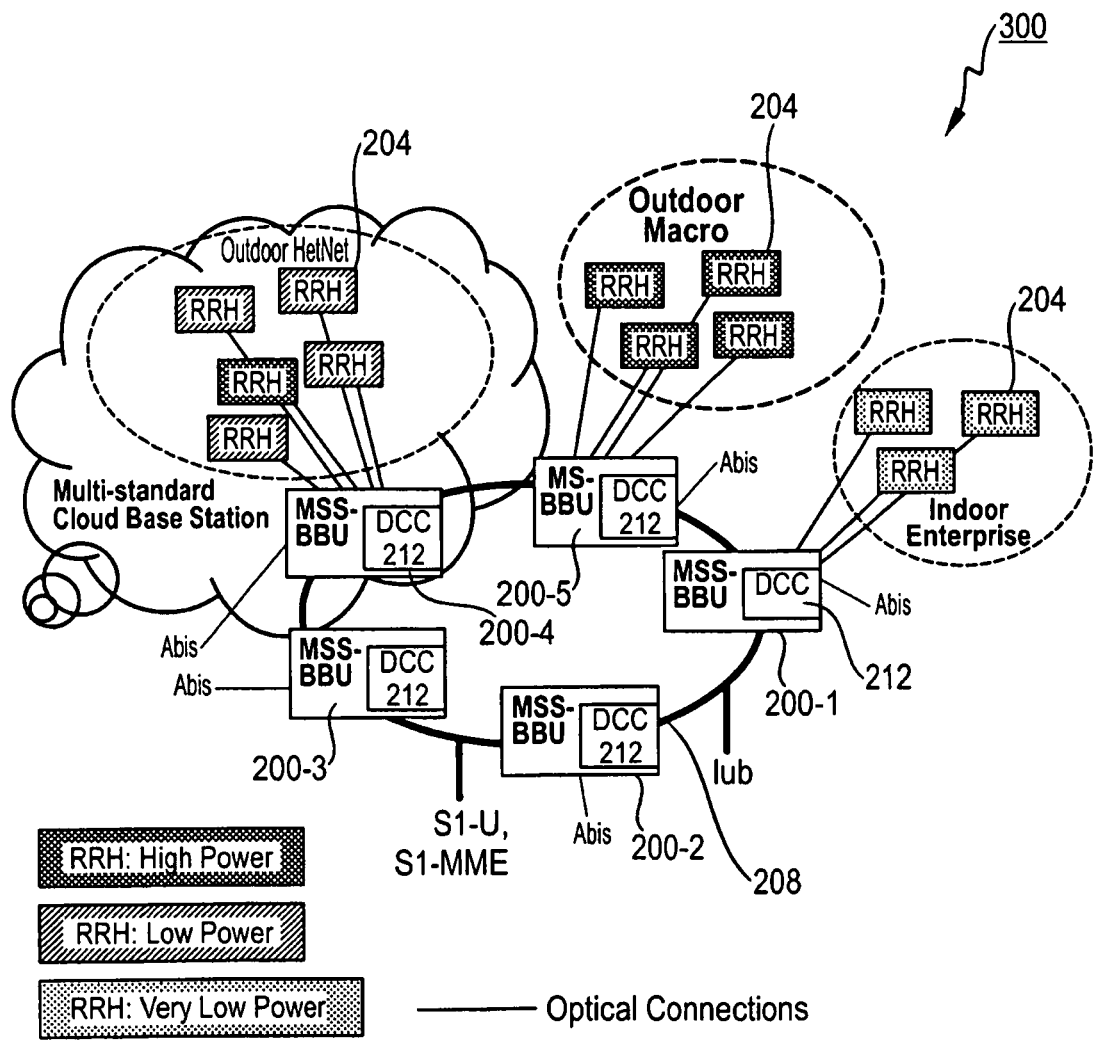
FIG. 3 illustrates a distributed mobile cloud network architecture comprising network of baseband processing apparatuses (BBUs), according to an embodiment of the present invention.

FIG. 3 shows a plurality of baseband processing apparatuses 200-1 to 200-5, which form a cloud computing network 300. There are different baseband processing apparatuses in different locations interconnected with each other via high-speed optical links, either as extended X2-interface or as proprietary solution. Each of the baseband processing apparatuses 200-1 to 200-5 which may also be referred to as Multi-site/standard Baseband Units (MSS-BBU) has associated thereto a plurality of RRHs 204. The RRHs 204 provide the transmit (Tx), Power. Amplifier (PA), receiver (Rx) and antenna functions and are spatially separated with high-speed optical links from the associated MSS-BBUs 200-1 to 200-5. The latter can be combined within a cluster for several radio units. The RRHs 204 exist with different output power levels to realize Macro-, Pico- and Femto-cells and may be installed in indoor- and/or outdoor environments. In the in outdoor Marco-cell scenario the respective RRHs 204 may be driven with relatively high power, whereas in an indoor scenario the respective RRHs 204 may be driven with comparatively low electric power. The MSS-BBU 200-4 has coupled thereto a plurality of RRHs 204 which serve both, outdoor Marco- and Pico-cells, respectively, leading to a so-called Heterogeneous cellular Network (HetNet). As has been already explained in the introductory portion with respect to FIG. 1, the various network parts or radio cells served by the individual oh MSS-BBUs 200-1 to 200-5 may experience completely different load scenarios at a given time instant, which provides room for load-balancing and processing capacity distribution from low to high-traffic areas. The tasks or functions may be performed by the decentralized load balancing concept, wherein each of the plurality of MSS-BBUs comprises a load balancer or decentralized cloud controller 212, as has been described above.

In FIG. 3 a MSS-BBU 200 and an associated cluster of RRHs 204 together represent a multi-standard cloud base station. The number of RRH 204 connected should be large enough to ensure enough potential load balancing gain. The limit of such a RRH cluster is given by the latency constraints of LTE and UMTS over the air-interface. The decentralized cloud controller (DCC) 212 is once in every MSS-BBU 200 and acts as a load manager to realize the load balancing within a multi-standard cloud base station and interacts with other DCCs 212 of other MSS-BBUs 200 for the purpose of inter cloud base station load balancing or processing capacity distribution to follow traffic hotspots or hot zones. Therewith, load profiles between different areas (e.g. indoor/outdoor, business/residential areas) can be leveled off and considerable cost savings can be achieved, both on CAPEX and OPEX. This all opens the path to apply technologies of cloud computing, establish load management and directly reduce the number of required processing resources and sites and with this the associated installation cost, but also maintenance and power consumption.

The DCCs 212 include several functions as, e.g., the load manager with the subtasks load balancing and processing capacity distribution from low to high traffic areas and a function as the configuration manager for the administration of the allocation of processing jobs to dedicated user data processors 210 for the intra- and inter MSS-BBU area. As shown in FIG. 3, a decentralized configuration such of a cloud controller is proposed by the present invention, where one DCC 212 is implemented in each MSS-BBU 200. The result is a hierarchical approach with two different levels of load management, i.e., intra MSS-BBU and inter MSS-BBU. The intra MSS-BBU level can be managed by a DCC 212 alone, by accessing all relevant internal processing resources. The Inter MSS-BBU level is realized by combination of an inter-communication between different DCCs 212 and the DCC internal functions. Hence, embodiments allow for a decentralized cloud controller architecture, which allows load balancing and processing capacity distribution from low traffic to high traffic areas.

Figure 4:
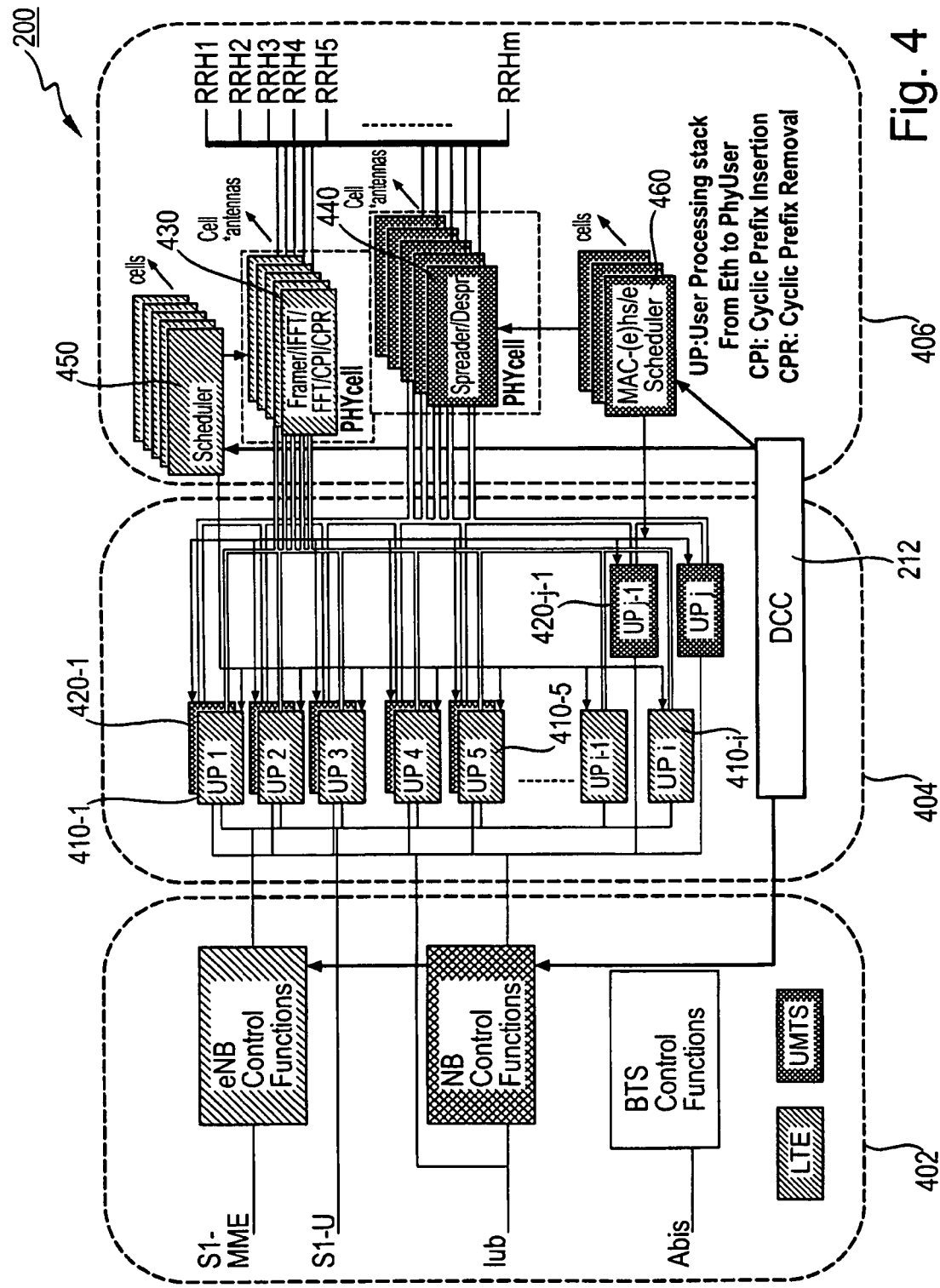
FIG. 4 shows a functional architecture of a baseband processing apparatus according to an embodiment of the present invention.

Turning now to FIG. 4, it is shown a possible functional architecture of a baseband processing apparatus or MSS-BBU 200, according to an embodiment of the present invention.

The baseband part of a MSS-BBU 200 can be subdivided in a control part 402, a user part 404 and a cell part 406. The control functions for various supported mobile communication network technologies, like, e.g. GSM, UMTS and LTE, are connected to the Abis, Iub and S1 Interfaces. Each of the plurality of dedicated user data processors 410, 420 of the user part 404 may be regarded as a virtual entity called UP, in which dedicated user processing for uplink (UL) as well as downlink (DL) takes place. According to an embodiment of the present invention, there may be a plurality of UP entities for LTE (denoted with reference numerals 410) and a plurality of UP entities for UMTS (denoted with reference numerals 420). Hence, the plurality of dedicated user data processors may comprise a first group of dedicated user data processing entities 410 which is operable to process user specific data according to a first radio access technology (e.g. LTE), and wherein the plurality of dedicated user data processors 210 may comprise a second group of dedicated user data processing entities 420 which is operable to process user specific data according to a second radio access technology (e.g. UMTS). Each of the user data processing entities 410, 420 is operable to perform user plane and/or dedicated control plane processing of the user specific data. The user plane parts of the UPs 410, 420 are connected to the S1-U/Iub interface, respectively. The dedicated control plane parts of the UPs 410, 420 are connected via the eNB-(LTE) and NodeB (UMTS) control functions to the S1-MME (LTE) and Iub (UMTS) interface, respectively.

The dedicated user processing (DL/UL) for LTE and UMTS is assumed to be virtualized. That is to say, for LTE a dedicated UP entity 410 may be operable to perform the following user plane and/or dedicated control plane protocol stack processing of the user specific data:

S1-MME Termination stack: ETH/IP/SCTP/S1AP ded. (dedicated Control Plane)

S1-U Termination stack: ETH/IP/UDP/GTP-U (User Plane)

Uu Control Plane stack: RRC/PDCP/RLC/MAC/PHYuser (dedicated Control Plane)

Uu User Plane stack: PDCP/RLC/MAC/PHYuser (User Plane)

For UMTS a dedicated UP entity 420 may be operable to perform the following user plane and/or dedicated control plane protocol stack processing of the user specific data:

Iub Termination User Plane stack for HSPA

ETH/IP/UDP/FP(HS-DSCH/e-DCH) (User Plane)

Uu Termination stack for HSPA: MAC (e) hs/e/PHYuser

All the other channels in UMTS as e.g. Dedicated Channel (DCH), Random Access Channel (RACH), Forward Access Channel (FACH), Paging Channel (PCH) are assumed not to be virtualized, due to the low expected load balancing gains and not considered here.

According to embodiments, a set of UPs 410, 420 of one standard can be allocated to one hardware resource up to its maximum bandwidth. Thereby, UP$_i$ denotes the overall number of supported LTE users in a cloud base station and UP$_j$ denotes the overall number of supported UMTS users in a cloud base station. Note that i,j are not fixed and depend on bandwidth for the singular user, respectively.

The MSS-BBU 200 may comprise a cell physical layer processor PHYcell 430 for LTE and a cell physical layer processor PHYcell 440 UMTS. In addition to the first and the second group of dedicated user data processing entities 410, 420 the MSS-BBU 200 may, hence, comprise a first cell physical layer processor 430 for processing radio frame data for a first RRH 204 supporting the first radio access technology (LTE) and a second cell physical layer processor 440 for processing radio frame data for a second RRH 204 supporting the second radio access technology (UMTS).

The PHYcell entity 430 for LTE may comprise a framer for (de-) composing or (de-) multiplexing radio frame structures. Additionally the PHYcell entity 430 may comprise functions like Fast Fourier Transform (FFT), Inverse Fast Fourier Transform (IFFT), Cyclic Prefix Insertion (CPI), Cyclic Prefix Removal (CPR). All these functions are available according to the number of LTE cells times the number of antennas per cell. The PHYcell entity 440 for UMTS may comprise a framer for (de-) composing or (de-) multiplexing radio frame structures. Additionally the PHYcell entity or the cell physical layer processor 440 may have spreading and/or de-spreading capabilities. These functions are available according to the number of UMTS cells times the number of antennas per cell. As an option the PHYcell entity 430, 440 may only include the basic framer functions of (de-) composing or (de-) multiplexing radio frame structures, if the additional functions IFFT/FFT/CPI/CPR for LTE and the functions Spreader/De-spreader for UMTS are integrated in an associated RRH 204 in order to save bandwidth at the optical link between MSS-BBU 200 and RRH 204. In FIG. 4, m RRHs 204 are exemplarily connected to the MSS-BBU 200. To summarize, the cell physical layer processors 430, 440 of the MSS-BBU 200 may be operable to perform one or more processing steps of the group of baseband-to-transmissionband conversion, transmissionband-to-baseband conversion, de-multiplexing, multiplexing, Fast Fourier Transform (FFT), Inverse Fast Fourier Transform (IFFT), Cyclic Prefix Insertion (CPI), Cyclic Prefix Removal (CPR), spreading, de-spreading.

Additionally, the MSS-BBU 200 may comprise a set of packet schedulers 450 for LTE and a set of packet schedulers 460 High Speed Packet Access (HSPA), wherein the packet schedulers correspond to the number of respective radio cells supported by the MSS-BBU 200. Any UP entity 410, 420 of one standard can be allocated to any PHYcell entity 430, 440 of the same standard. This means that any LTE related UP entity 410 may be allocated to any LTE related PHYcell entity 430 comprising at least the framer functionality. Correspondingly, any UMTS related UP entity 420 may be allocated to any UMTS related PHYcell entity 440 comprising at least the framer functionality, i.e. (de-) composing or (de-) multiplexing radio frame structures. The allocation of UP entities to PHYcell entities may be directly controlled by the responsible cell schedulers 440, 450.

The overall management of the allocation of a virtual processing entity UP 410 or 420 to a PHYcell function 440 or 450 may be done by the MSS-BBU's load balancer or DCC 212.

In the example of FIG. 4, the GSM part is not considered to be virtualized since no significant traffic growth for GSM is expected in the future.

Figure 5:
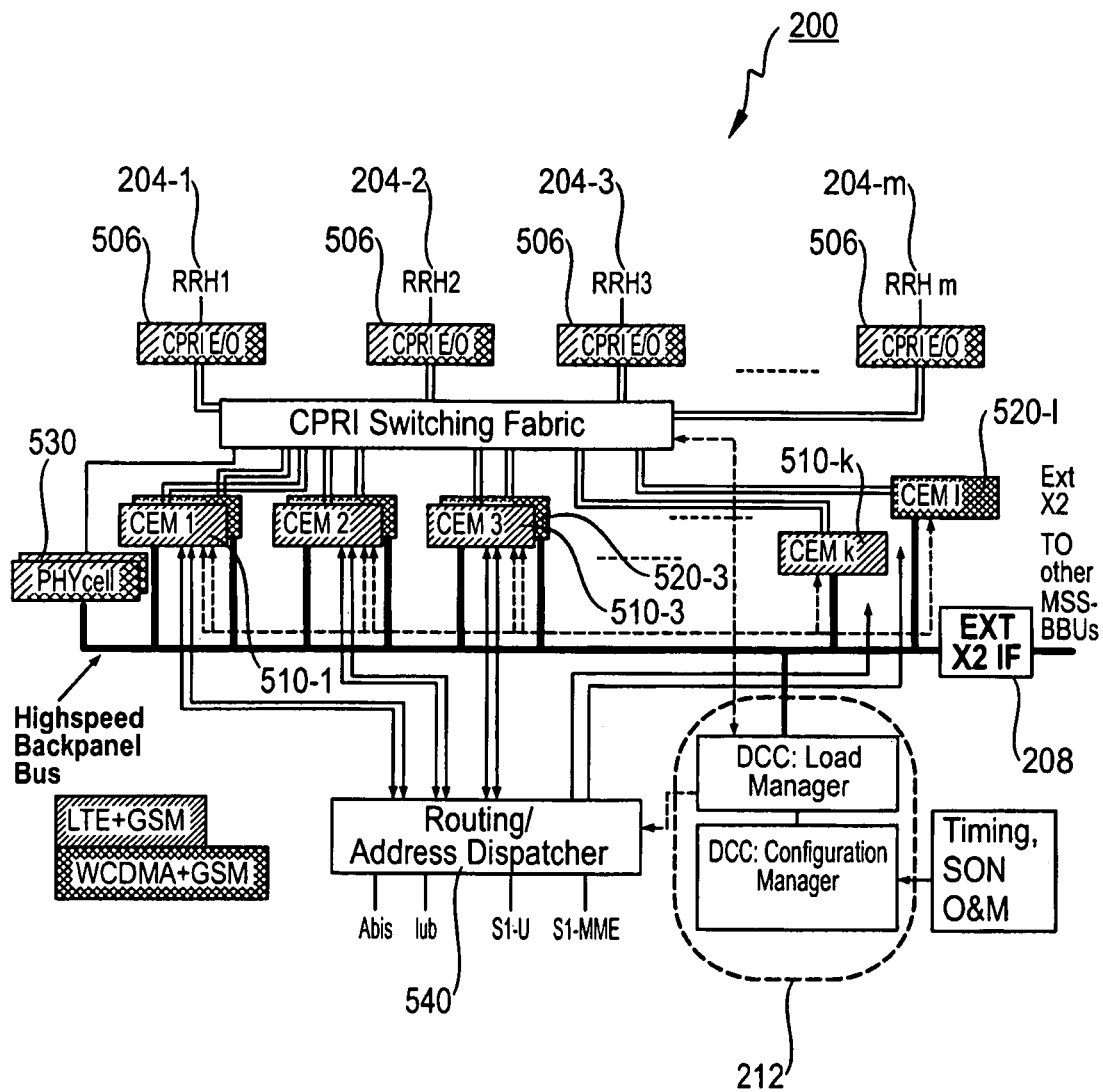
FIG. 5 illustrates hardware architecture of a baseband processing apparatus according to an embodiment of the present invention.

FIG. 5 schematically illustrates exemplary hardware architecture of a baseband processing apparatus or MSS-BBU 200, which is coupled to a plurality of m RRHs 204-1 to 204-m via an CPRI interface 506, for example. Thereby the CPRI denotes an interface of radio base stations between the Radio Equipment Control (REC), i.e. the MSS-BBU 200, and the Radio Equipment (RE), i.e. the RRHs 204-1 to 204-m.

The MSS-BBU 200 may comprise a plurality of Channel Element Modules (CEMs) 510, 520, wherein a CEM may be regarded as a hardware module in form of a Digital Signal Processor (DSP), General Purpose Processor (GPP) or any hardware accelerator as a Printed Circuit Board (PCB), for example. In the example of FIG. 5, the CEMs 510 comprise LTE related UP entities 410, wherein the CEMs 520 comprise UMTS related UP entities 420, respectively. A channel element module 510, 520 may accommodate a set of UPs depending on bandwidth per user up to a maximum bandwidth+cell functions for one RRH (PHYCell+Cell control functions+Radio Resource Management functions). That is to say, the first cell physical layer processor entity 440 (related to LTE) and the first group of dedicated user data processing entities 410 (related to LTE) may be integrated onto a first common CEM 510 (related to LTE). At the same time the second cell physical layer processor 450 (related to UMTS) and the second group of dedicated user data processing entities 420 may be integrated onto a second common CEM 520 (related to UMTS). A CEM 510, 520 may therefore act either as a LTE or UMTS specific BBU HW module. According to some embodiments it may be changed to the respective other radio standard by software (SW) replacement.

In addition a CEM 510, 520 may provide the packet schedulers 440, 450 for LTE and HSPA, which are needed on a cell basis. In the embodiment illustrated in FIG. 5, a CEM board 510, 520 is available Mimes for UMTS and K-times for LTE, respectively. In embodiments the ratio between I and K may be modified. This means that a modification of the multistandard mix between UMTS and LTE within the MSS-BBU 200 may be done with SW replacement without any hardware modifications. Hence, according to some embodiments, the ratio I/K or K/I between dedicated user data processing entities 410 comprised by the first group related to LTE and dedicated user data processing entities 420 comprised by the second group related to UMTS may be configurable via software replacement. This is not possible with conventional solutions.

An additional PHYcell HW module 530 may accommodate additional PHYcell functions for LTE and for UMTS, as described above. This additional PHYcell module 530, which may be coupled to neighboring MSS-BBUs 200 via the inter-BBU-interface 208, may be needed, if the load balancing gains as a result of the cloud configuration are used to reduce a number of employed CEMs (reduction of CAPEX) per MSS-BBU 200. In this case some users served by the MSS-BBU's radio cell may have to be processed by other MSS-BBUs of the cloud network 300.

However, due to the additional PHYcell HW or cell physical layer processor module 530, a full connectivity to all existing RRHs 204 in the cluster may still be provided. The MSS-BBU 200 may hence comprise an additional cell physical layer processor 530 supporting both radio access technologies (e.g. LTE and UMTS), wherein the additional cell physical layer processor entity 530 is coupled to the interface 208 to transmit or receive second user specific data to or from the second node in response to the exchanged load information. As described before, the second user specific (bearer) data belongs to at least one second user who is indeed associated to at least one RRH 204 of the MSS-BBU 200 but cannot be processed at the MSS-BBU 200 itself due to the lack of hardware or processing resources.

If there are enough processing resources available, the dedicated user data processing (UP) and cell control functions may only processed in the CEMs 510, 520.

According to some embodiments, the CEMs 510, 520 and the PHYcell HW boards 530 within one MSS-BBU 200 may be interconnected via an internal high-speed back panel. Instead, for the interconnection of CEMs 510, 520 or PHYcell entities 530 with CEMs from other MSS-BBUs either an extended X2 interface (see reference numeral 208) or a proprietary interface may be used.

According to FIG. 5, the DCC 212 may comprise two main parts, i.e. a DCC load manager, which may be responsible for load balancing and/or distribution algorithms for both intra- and inter-MSS-BBU load distributions. A second main part is the DCC Configuration manager, which may instantiate processing entities and/or associate processing entities to users, cells, and CEMs.

The router/address dispatcher entity 540 may be needed to route the S1-U, S1-MME and Iub user or bearer specific packets in a direct way to the allocated CEM 510, 520 decided by the DCC 212. This may minimize the transfers of signals between different CEMs 510, 520.

The CPRI switch 506 may be regarded as an optional entity, which might be needed in case of recovery for a failed CEM 510, 520 in order not to lose a connected RRH 204-1 to 204-m. Another (working) CEM or PHYcell hardware module 530 can use one of its available CPRI interfaces for this purpose. The CPRI switch 506 in this case may perform an electrical CPRI switching and a reallocation of its CPRI interfaces from a CEM 510, 520 to a RRH 204-1 to 204-m.

The described MSS-BBU HW architecture of a cloud base station allows load balancing and a multi-standard configuration, wherein the mix of UMTS and LTE and be modified in a semi-static way by SW replacement.

Figure 6:
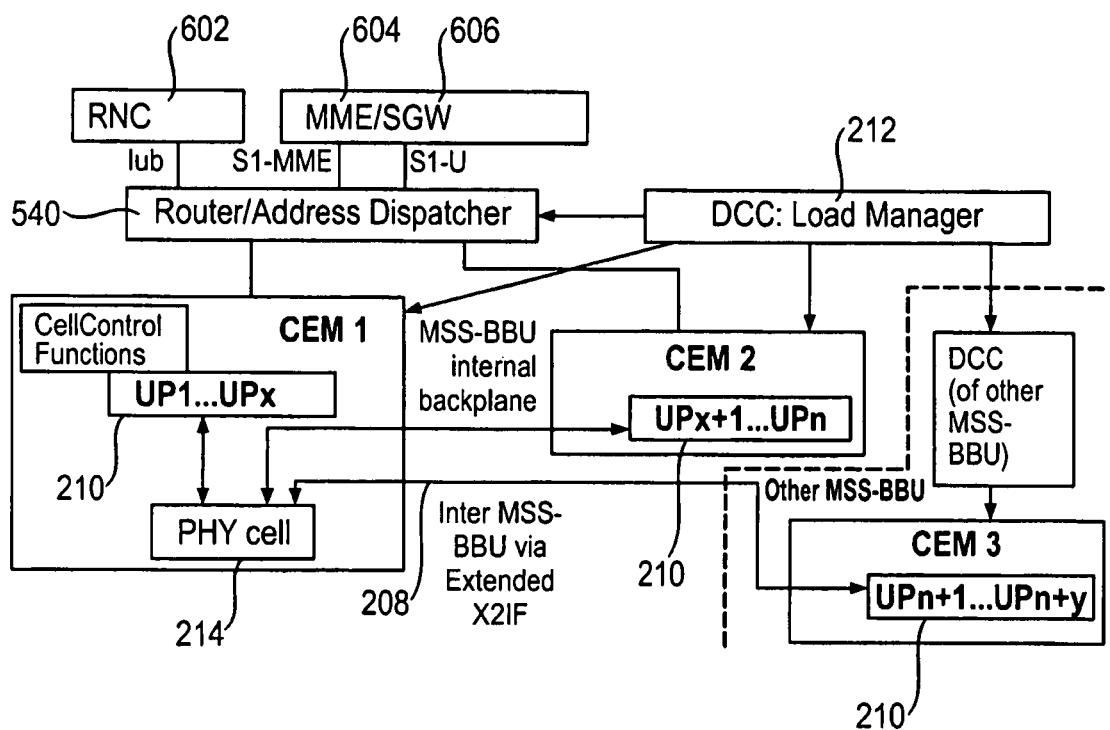
FIG. 6 shows a multi-standard virtualization concept according to an embodiment of the present invention.

Turning now to FIG. 6 it is summarized the multi-standard virtualization concept of the present invention.

A Radio Network Controller (RNC) 602, a Mobility Management Entity (MME) 604 and a Serving Gateway (SGW) 606 may be connected to a baseband processing apparatus or MSS-BBU 200 via the Router/Address Dispatcher 540. A routing of LTE and UMTS user specific data packets to the CEMs 510, 520 for the processing is transparent to the RNC 602, MME 604 and SGW 606. For that purpose the router/address Dispatcher 540 may emulate one or (typically) more base stations towards the core network, which are composed of a set virtual instances from the type PHYcell entity (cell physical layer processor) and CEM. The router/address Dispatcher 540 may terminate the protocol interfaces and perform an n-tuple, m-step routing process (typically realized by nested table lookup) to find the virtual entity for the execution. Once found, the protocol headers may be adjusted to allow an IP protocol based transport within the cloud. From a birds-eye view the routing process may resemble the function of a NA(P)T Gateway (Network Address and Port Translation), but the difference is that the mapping from inner to outer addressing is not chosen arbitrarily (as in case of NA(P)T), but on the knowledge gained by deep packet inspections.

In FIG. 6, CEM1 and CEM2 are assumed to be in the same MSS-BBU of one cloud base station, while CEM3 is assumed to be part of another MSS-BBU of another cloud base station. The CEM1 is assumed to provide all the cell control functions and the PHYcell (physical layer processing) for a particular cell of interest. The load manager of DCC 212 decides which UPs 210 for one cell are processed by which CEM within one MSS-BBU (in this example CEM1 and CEM2) and intercommunicates with the DCC of another MSS-BBU if, for this cell, additional processing for UPs is needed from external (in this example allocated to the CEM3). All UPs 210 for one cell (in this example from CEM1, CEM2 and CEM3) are then connected in duplex direction to the PHYcell physical layer processor 214 of CEM1. This means between CEM1 and CEM2 may be connected via internal high-speed backplane, and CEM1 and CEM3 may be connected via extended X2-interface or any proprietary interface. Hence, the first node or MSS-BBU (accommodating CEM1 and CEM2) may comprise a cell physical layer processor 214 for processing a baseband radio frame structure of a radio frame to or from at least one remote radio head coupled to the first node. The load balancer 212 of the first node and/or the load balancer 212 of the second node (second MSS-BBU) may be operable to initiate an exchange of user or bearer specific data between the first node and the second node via the interface 208 (in response to previously exchanged load information), wherein the exchanged user specific data is dedicated to a user associated to the at least one remote radio head of the first node. In this way the exchanged user or bearer specific data may be processed by a dedicated user data processor (UP) of the second node before (e.g. in case of downlink direction) or after (e.g. in case of uplink direction) it is processed by the cell physical layer processor 214 of the first network node.

For users 1 ... x (UP1 ... UPx) the CEM1 may be regarded as a Control and the Serving CEM (CCEM & SCEM). For the users x+1 ... n (UPx+1 ... UPn) the CEM1 is the Control CEM (CCEM) and the CEM2 the Serving CEM (SCEM). For the users n+1 ... n+y (UPn+1 ... UPn+y) the CEM1 is the Control CEM (CCEM) and the CEM3 the External Serving CEM (ESCEM). The PHYcell physical layer processor 214 of the CEM1 may then be connected to one RRH, which represents here the radio cell of interest. The CCEM, SCEM and ESCEM may be understood as logical functions for a particular user.

Hence, the dedicated user data processors (UPs) of users of one cell and the allocated PHYcell functions may run either on the same CEM or on different CEMs of the same MSS-BBU, or may even come from different MSS-BBUs.

Figure 7:
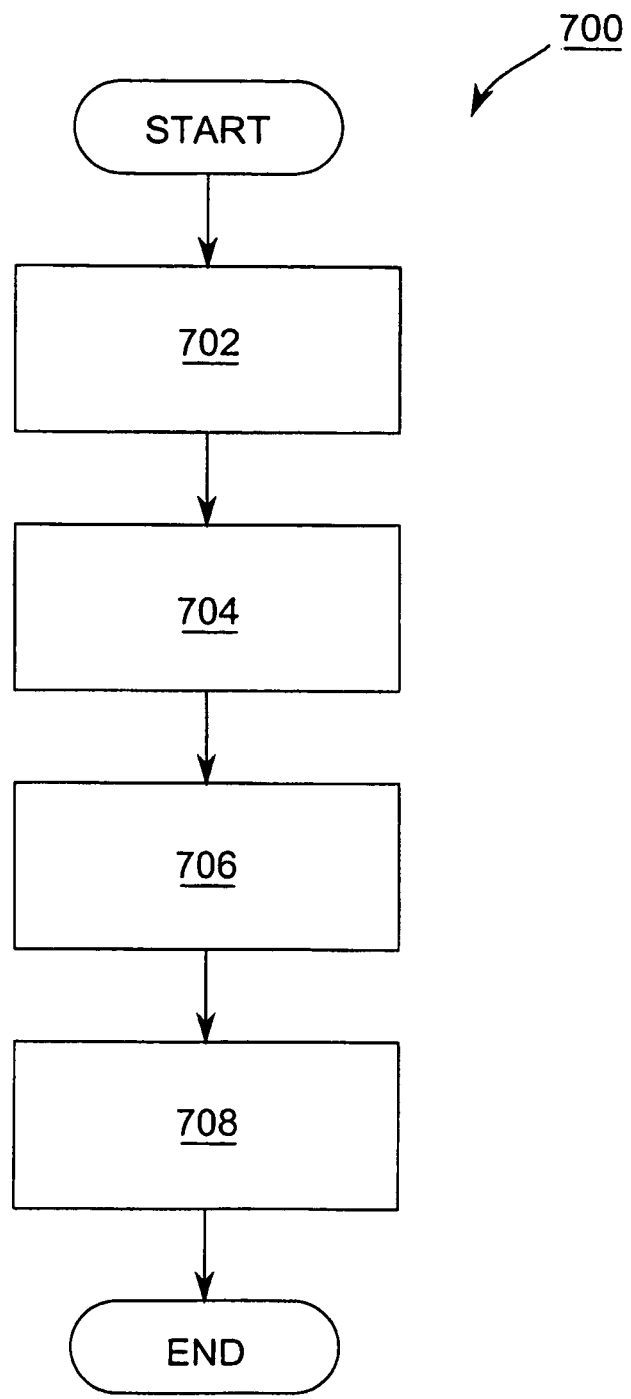
FIG. 7 schematically shows a flow chart of a method for baseband processing apparatus, according to an embodiment of the present invention.

Turning now to FIG. 7, a method 700 which may be performed by a baseband processing apparatus or MSS-BBU 200 will be described.

The method 700 comprises a step 702 of connecting the baseband processing apparatus 200 as a first node of a cloud computing network 300 to a further baseband processing apparatus as a second node of the cloud computing network via an inter-BBU interface 208. In a further step 704 user (bearer) specific data of first users being associated to the at least one remote radio head of the baseband processing apparatus 200 is processed using plurality of dedicated user data processors 210. The method 700 also comprises a step 706 of exchanging load information with the second node via the interface 208. In a step 708 processing tasks are distributed between the plurality of dedicated user data processors 210 of the first node and/or processing tasks are distributed between plurality of dedicated user data processors 210 of the first node 200 and the second node in response to the exchanged load information in order to distribute load among different nodes of the cloud computing network 300.

Embodiments of the aforementioned apparatuses may comprise a signal processor, respectively, executing a computer program having a program code for performing or supporting embodiments of the above described method when the computer program is executed on said processor. Hence, embodiments may provide a computer program having a program code for performing one of the above described methods when the computer program is executed on a computer or processor. A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

To summarize, starting from high level discussions of cloud computing in the RAN embodiments of the present invention propose details of a novel decentralized architecture concept. Depending on the technical and economic requirements and optimization some of the discussed elements may be taken into account for future systems. Embodiments may provide decentralized cloud controller architecture, a functional architecture of a MSS-BBU in a cloud base station, MSS-BBU HW architecture in a cloud base station, and a virtualization concept in a cloud configuration.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A baseband processing apparatus for processing baseband signals to or from at least one first remote radio head, the at least one first remote radio head serving at least one first radio cell of a cellular communication system, the baseband processing apparatus comprising:

an interface to connect the baseband processing apparatus, as a first node of a network, to a further baseband processing apparatus as a second node of the network for processing baseband signals to or from at least one second remote radio head, the at least one second remote radio head serving at least one second radio cell of the cellular communication system;

a plurality of dedicated user data processors, wherein each is operable to process user specific data of first users being associated to the at least one first radio cell, the processing of the user specific data of the first users leading to a processing load of the first node; and a load balancer operable to exchange load information with a load balancer of the second node via the interface and to distribute processing tasks between the plurality of dedicated user data processors of the first node and to distribute processing tasks between the plurality of dedicated user data processors of the first node and the second node in response to the exchanged load information in order to distribute processing load among different nodes of the network.

2. The baseband processing apparatus of claim 1, wherein the load balancer is operable to initiate an exchange of second user specific data with the second node via the interface in response to the exchanged load information, the second user specific data being associated to a second user associated to the at least one first radio cell, wherein the baseband processing apparatus further comprises:

a cell physical layer processor for processing a baseband radio frame structure of a radio frame to or from the at least one first remote radio head serving the first users and the second user of the at least one first radio cell, the radio frame comprising the user specific data of the first users and the user specific data of the second user.

3. The baseband processing apparatus of claim 2, wherein the load balancer is operable, in response to the exchanged load information, to initiate a processing of second user specific downlink data for a second user associated to the at least one first radio cell at the second node, and to receive the processed second user specific downlink data from second node via the interface, wherein the dedicated user data processor is operable to process first user specific downlink data for the first users, and wherein the cell physical layer processor is operable to multiplex the first and the second user specific downlink data into a common downlink radio frame structure according a downlink multiple access technology.

4. The baseband processing apparatus of claim 2, wherein the cell physical layer processor is operable to de-multiplex received first and second user specific uplink data from a multiplexed uplink radio frame structure according an uplink multiple access technology, wherein the first and second user specific uplink data are associated to a first and a second user of the at least one first radio cell, respectively, wherein the load balancer is operable, in response to the exchanged load information, to initiate a further processing of the de-multiplexed second user specific uplink data at the second node, and wherein the dedicated user data processor is operable to further process the de-multiplexed first user specific uplink data.

5. The baseband processing apparatus of claim 2, wherein a dedicated user data processor is operable to perform user plane protocol stack processing and/or dedicated control plane protocol stack processing of the user specific data and/or wherein the cell physical layer processor is operable to perform one or more processing steps of the group of baseband-to-transmissionband conversion, transmissionband-to-baseband conversion, de-multiplexing, multiplexing, Fast Fourier Transform, Inverse Fast Fourier Transform, Cyclic Prefix Insertion, Cyclic Prefix Removal, spreading, and de-spreading.

6. The baseband processing apparatus of claim 1, wherein the plurality of dedicated user data processors comprises a first group of dedicated user data processing entities which is operable to process user specific data according to a first radio access technology, and wherein the plurality of dedicated user data processors comprises a second group of dedicated user data processing entities which is operable to process user specific data according to a second radio access technology.

7. The baseband processing apparatus of claim 6, comprising a first cell physical layer processor for processing radio frame data for a first remote radio head supporting the first radio access technology and a second cell physical layer processor for processing radio frame data for a second remote radio head supporting the second radio access technology.

8. The baseband processing apparatus of claim 7, wherein the first cell physical layer processor and the first group of dedicated user data processing entities are integrated onto a first common printed circuit board and wherein the second cell physical layer processor and the second group of dedicated user data processing entities are integrated onto a second common printed circuit board.

9. The baseband processing apparatus of claim 6, wherein a ratio between dedicated user data processing entities comprised by the first group and dedicated user data processing entities comprised by the second group is configurable via software replacement.

10. The baseband processing apparatus of claim 8, comprising an additional cell physical layer processor supporting both radio access technologies, wherein the additional cell physical layer processor is coupled to the interface to transmit or receive second user specific data to or from the second node in response to the exchanged load information.

11. The baseband processing apparatus of claim 2, wherein at least a part of the plurality of dedicated user data processors and the cell physical layer processor are integrated onto different printed circuit boards, respectively.

12. A network, comprising:
a first baseband processing apparatus serving at least one first radio cell as a first node of the network; and
a second baseband processing apparatus serving at least one second radio cell as a second node of the network,
wherein the load balancers of the first and the second node are operable to exchange load information via the interface between the first and the second node and to distribute processing tasks between the plurality of dedicated user data processors of the first node and the second node in response to the exchanged load information in order to distribute load among different nodes of the network.

13. The network of claim 12, wherein the first node comprises a cell physical layer processor for processing a baseband radio frame structure of a radio frame to or from at least one first remote radio head coupled to the first node, wherein the load balancer of the first and/or the second node is operable to initiate an exchange of user specific data between the first node and the second node via the interface in response to the exchanged load information, the exchanged user specific data being dedicated to a user associated to the at least one first remote radio head of the first node, such that the exchanged user specific data is processed by a dedicated user data processor of the second node before or after being processed by the cell physical layer processor of the first node.

14. The network of claim 12, wherein the network is a cloud computing network.

15. A method of a baseband processing apparatus, the method comprising:
- connecting the baseband processing apparatus as a first node of a cloud computing network to a further baseband processing apparatus as a second node of the cloud computing network via an interface;
- processing, using plurality of dedicated user data processors, user specific data of first users being associated to the at least one first radio cell, wherein the processing of the user specific data of the first users leads to a load at the first node;
- exchanging load information with the second node via the interface; and
- distributing processing tasks between the plurality of dedicated user data processors of the first node and distributing processing tasks between the plurality of dedicated user data processors of the first node and the second node in response to the exchanged load information in order to distribute load among different nodes of the cloud computing network.

16. A computer program having a program code for performing the method of claim 15, when the computer program is executed on a computer or processor.

* * * * *